United States Patent [19]

Kurnit

[11] 4,394,623
[45] Jul. 19, 1983

[54] RING CAVITY FOR A RAMAN CAPILLARY WAVEGUIDE AMPLIFIER

[76] Inventor: Norman A. Kurnit, Santa Fe, N. Mex., granted to U.S. Department of Energy under the provisions of 42 U.S.C. 2182

[21] Appl. No.: 229,023

[22] Filed: Jan. 27, 1981

[51] Int. Cl.³ .............................................. H01S 3/30
[52] U.S. Cl. ...................................... 330/4.3; 372/3; 372/94; 307/426
[58] Field of Search .......................... 330/4.3, 4.5, 4.6; 372/3, 14, 94, 96; 307/426

[56] References Cited

U.S. PATENT DOCUMENTS

| | | | |
|---|---|---|---|
| 3,914,709 | 10/1975 | Pike et al. | 372/94 |
| 4,205,278 | 5/1980 | George et al. | 372/14 |
| 4,280,109 | 7/1981 | Stappaerts | 372/3 |
| 4,306,195 | 12/1981 | Stappaerts | 307/426 |
| 4,344,042 | 8/1982 | Hon | 330/4.3 |

OTHER PUBLICATIONS

Basov et al., "Hydrogen Raman Laser ... Pulses," 6/79, pp. 780–781, Sov. Jour. Quantum Elec., 9(6).
Ewing, et al., "Optical Pulse Compressor ... ", 5/79, pp. 367–379, IEEE Journ. of Quent. Elec., vol. QB-15, #5.

Primary Examiner—Nelson Moskowitz
Attorney, Agent, or Firm—Paul D. Gaetjens; Samuel M. Freund; Richard G. Besha

[57] ABSTRACT

A regenerative ring amplifier and regenerative ring oscillator which function to feed back a portion of the Stokes signal to complete the ring cavity. The ring cavity configuration allows the $CO_2$ laser pump signal and Stokes signal to copropagate through the Raman capillary waveguide amplifier. A Raman capillary waveguide amplifier is also provided in the return leg of the ring cavity to increase gain without increasing the round trip time. Additionally, the ring cavity can be designed such that the amplifier Stokes signal is synchronous with the mode-locked spikes of the incoming $CO_2$ laser pump signal.

12 Claims, 6 Drawing Figures

Fig. I

RING CAVITY FOR A RAMAN CAPILLARY WAVEGUIDE AMPLIFIER

BACKGROUND OF THE INVENTION

The present invention pertains generally to lasers and more particularly to stimulated Raman scattering utilizing rotational transitions in a diatomic molecular gas. This invention is the result of a contract with the Department of Energy (Contract No. W-7405-ENG-36).

The present invention comprises an improvement over U.S. Pat. No. 4,222,011, issued Sept. 9, 1980, to Norman A. Kurnit entitled "Stokes Injected Raman Capillary Waveguide Amplifier." The disclosure of the above-referenced patent is hereby incorporated by reference. As disclosed in the above-referenced patent, various methods have been disclosed for shifting frequencies of conventional lasers in the ir spectrum. These methods have included four wave mixing as disclosed in U.S. Pat. No. 4,095,121 by Richard F. Begley et al. entitled "Resonantly Enhanced Four Wave Mixing," and Raman scattering, as disclosed in U.S. Pat. No. 4,061,921 by C. D. Cantrell et al. entitled "Infrared Laser Systems" and reissue application Ser. No. 967,171 filed Mar. 16, 1979 by C. D. Cantrell et al. entitled "Infrared Laser System," now U.S. Pat. No. Re. 30,898 issued Apr. 6, 1982.

In each of these systems and other previous systems for ir frequency shifting to a broad range of frequencies, simplicity and overall efficiency are important factors for economic utilization of the device.

Since the stimulated Raman effect can be produced in a single step with high conversion efficiency, Raman shifting of $CO_2$ laser radiation provides high overall efficiencies due to the high efficiencies and well developed technology of $CO_2$ lasers. However, Raman gain in gaseous media such as $H_2$, $D_2$, HD, HT, DT, or $T_2$, require powers which are near the breakdown threshold of these diatomic molecular gases for a single pass focus geometry such as suggested by Robert. L. Byer, in an article "A 16 Micron Source for Laser Isotope Enrichment" published in IEEE Journal of Quantum Electronics, QE-12, pp. 732–733 (November 1976).

The above-referenced U.S. Pat. No. 4,222,011 by Norman A. Kurnit, of which the present invention comprises an improvement, discloses a capillary waveguide amplifier and regenerative amplifier which utilize a Stokes injection source to reduce the required field strength of the $CO_2$ laser radiation and eliminate the necessity for spontaneous generation of Stokes radiation within the capillary waveguide amplifier. However, in a single pass waveguide amplifier configuration, high output energies are not typically obtainable due to the limited output power of the Stokes injection source. The use of a regenerative amplifier such as disclosed in FIG. 2 of the above-referenced patent fails to overcome the problems of the single pass geometry since the power of the Stokes injection source is limited by the dichroic mirrors utilized in the regenerative system and the fact that the only significant gain produced in the capillary waveguide amplifier is achieved when the Stokes signal is copropagating with the $CO_2$ laser pump radiation in the forward direction. Although it is possible to reflect back the $CO_2$ radiation so that both the Stokes signal and the $CO_2$ laser pump signal copropagate in both the forward and reverse directions in the regenerative capillary waveguide amplifier, the field intensity may be increased beyond the breakdown threshold of the Raman scattering medium gas. When this occurs, no gain can be achieved.

Additionally, since the Stokes source in many applications has a pulse width much smaller than the $CO_2$ laser pulse width, only a small fraction of the $CO_2$ laser energy can be extracted in a system such as disclosed in the above-referenced U.S. Pat. No. 4,222,011. Consequently, it would be desirable to extract energy over a broader range of the $CO_2$ pulse width.

SUMMARY OF THE INVENTION

It is therefore an object of the present invention to provide a ring cavity for a Stokes injected Raman capillary waveguide amplifier system.

It is also an object of the present invention to provide a regenerative ring amplifier.

Another object of the present invention is to provide a regenerative ring oscillator.

Additional objects, advantages, and novel features of the invention are set forth in part in the description which follows and will become apparent in part to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the ring cavity of the present invention may comprise Raman capillary waveguide amplifier means for Raman scattering $CO_2$ laser radiation by rotational states of a diatomic molecular gas; external Stokes radiation source means aligned for injecting an external Stokes signal into said Raman capillary waveguide amplifier means such that said external Stokes signal reduces the gain required in said Raman capillary waveguide amplifier to generate an amplified Stokes signal; means for injecting a portion of said amplified Stokes signal back into said Raman capillary waveguide amplifier means in the same direction as said external Stokes signal to extend the effective duration of said external Stokes signal and to extract additional energy from said $CO_2$ laser radiation.

The present invention may also comprise, in accordance with its objects and purposes, a ring cavity for a Stokes injected Raman capillary waveguide amplifier comprising a source of $CO_2$ laser pump radiation; an external source of Stokes radiation; capillary waveguide amplifier means containing a diatomic molecular gas; means for injecting said $CO_2$ laser pump radiation and said Stokes radiation into said capillary waveguide amplifier means to induce amplification of said Stokes radiation by Raman scattering of said $CO_2$ laser pump radiation using rotational transitions in said diatomic molecular gas; means for feeding back a portion of said Stokes radiation amplified by said capillary waveguide amplifier means for injection into said capillary waveguide amplifier in the same direction as said $CO_2$ laser pump radiation to cause said $CO_2$ laser pump radiation and said Stokes radiation amplified by said capillary waveguide amplifier means to copropagate through said capillary waveguide amplifier means to increase spatial and temporal overlap and extraction of energy from said $CO_2$ laser pump radiation.

The present invention may also comprise, in accordance with its objects and purposes, a regenerative ring amplifier comprising $CO_2$ laser means for producing a $CO_2$ laser pump signal Stokes radiation source means for producing a Stokes radiation signal; means for combining said $CO_2$ laser pump signal and said Stokes radiation signal to produce a combined copropagating $CO_2$ laser pump signal and Stokes radiation signal; means for directing said copropagating $CO_2$ laser pump signal and Stokes radiation signal through a first Raman scattering capillary waveguide amplifier means to amplify said Stokes radiation signal by Raman scattering of said $CO_2$ laser pump signal using rotational transitions in a diatomic molecular gas; means for directing said copropagating $CO_2$ laser pump signal and Stokes radiation signal through at least one additional Raman capillary waveguide amplifier in a return leg of said ring cavity to further amplify said Stokes radiation signal by Raman scattering of said $CO_2$ laser pump signal using rotational transitions in a diatomic molecular gas; means for combining a portion of said amplified Stokes radiation signal with said combined copropagating $CO_2$ laser pump signal and said Stokes radiation signal in a single beam path to increase the intensity of Stokes radiation in said regenerative ring amplifier and thereby increase the amount of energy extracted from said $CO_2$ laser pump signal.

The present invention may also comprise, in accordance with its objects and purposes, a regenerative ring oscillator comprising $CO_2$ laser means for producing a $CO_2$ laser pump signal; means for directing said $CO_2$ laser pump signal through a first Raman capillary waveguide amplifier means to spontaneously generate a Stokes signal by Raman scattering of said $CO_2$ laser pump signal using rotational transitions in a diatomic molecular gas; means for directing said $CO_2$ laser pump signal and said Stokes signal in a copropagating beam through at least one additional Raman capillary waveguide amplifier in a return leg of said ring cavity to further amplify said Stokes signal; means for feeding back a portion of said Stokes signal into said regenerative ring oscillator to increase the intensity of Stokes radiation in said regenerative ring oscillator and thereby increase the amount of energy extracted from said $CO_2$ laser pump signal.

The present invention may also comprise, in accordance with its objects and purposes, a regenerative ring amplifier comprising $CO_2$ laser means for producing a $CO_2$ laser pump signal; Stokes radiation source means for producing a Stokes radiation signal; means for combining said $CO_2$ laser pump signal and said Stokes radiation signal to produce a combined copropagating $CO_2$ laser pump signal and Stokes radiation signal; means for directing said copropagating $CO_2$ laser pump signal and Stokes radiation signal through Raman scattering waveguide amplifier means to amplify said Stokes radiation signal by Raman scattering of said $CO_2$ laser pump signal using rotational transitions in a diatomic molecular gas; means for combining a portion of said amplified Stokes radiation signal with said combined copropagating $CO_2$ laser pump signal and said Stokes radiation signal in a single beam path to increase the intensity of Stokes radiation in said regenerative ring amplifier and thereby increase the amount of energy extracted from said $CO_2$ laser pump signal.

The present invention may also comprise, in accordance with its objects and purposes, a regenerative ring oscillator comprising $CO_2$ laser means for producing a $CO_2$ laser pump signal; means for directing said $CO_2$ laser pump signal through Raman capillary waveguide amplifier means to spontaneously generate a Stokes signal by Raman scattering of said $CO_2$ laser pump signal using rotational transitions in a diatomic molecular gas; means for feeding back a portion of said Stokes signal into said regenerative ring oscillator to increase the intensity of Stokes radiation in said regenerative ring oscillator and thereby increase the amount of energy extracted from said $CO_2$ laser pump signal.

The advantages of the present invention are that the regenerative ring amplifier only requires a low power Stokes injection source to produce a high intensity Stokes radiation signal within the ring cavity since a portion of the Stokes radiation signal is fed back into the ring cavity during each cycle for further amplification. Additionally, in the case of short duration Stokes input pulses, the portion of the Stokes signal fed back into the ring cavity extracts energy from a latter portion of the $CO_2$ pulse so as to provide better temporal overlap. Moreover, the Stokes signal copropagates with the $CO_2$ laser pulse around the ring cavity to thereby provide complete spatial overlap. The combination of these factors allows a much greater portion of the $CO_2$ laser pulse energy to be extracted.

BRIEF DESCRIPTION OF THE DRAWINGS

The accompanying drawings, which are incorporated in and form a part of the specification, illustrate the preferred embodiment of the invention, and together with the description, serve to explain the principles of the invention. In the drawings.

DETAILED DESCRIPTION OF THE PREFERRED EMBODIMENT OF THE INVENTION

Figure 1:
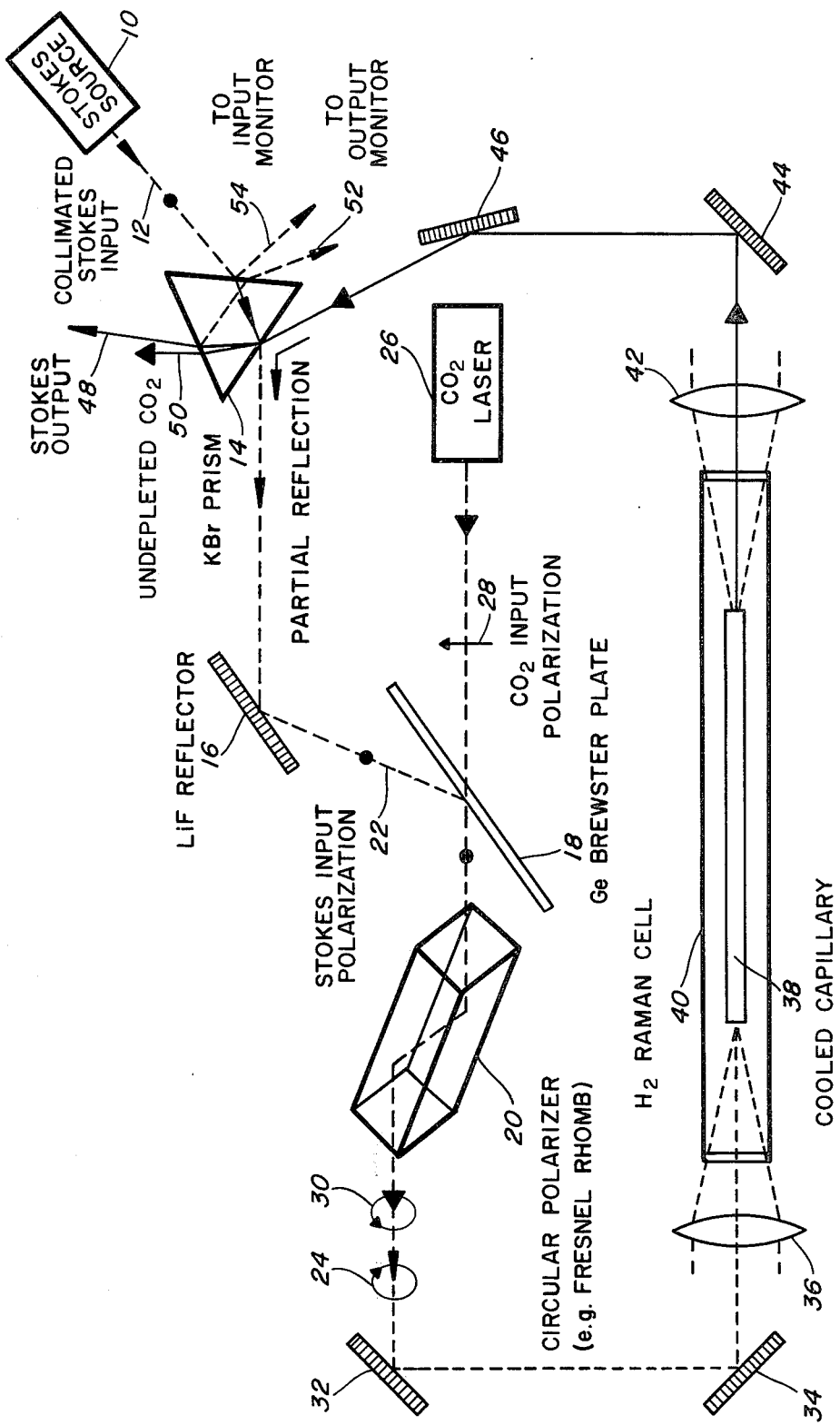
FIG. 1 is a schematic illustration of the regenerative ring amplifier of the preferred embodiment of the invention.

FIG. 1 is a schematic illustration of the regenerative ring amplifier of the preferred embodiment of the present invention. As illustrated in FIG. 1, a Stokes source 10 produces a collimated Stokes input 12 which is injected into the regenerative ring amplifier by way of KBr prism 14. The Stokes signal is then reflected by LiF reflector 16 and Ge Brewster plate 18 and applied to circular polarizer 20 which can comprise a Fresnel rhomb or other suitable circular polarizer such as disclosed in W. H. Southwell, "Multilayer High Reflective Coating Designs Achieving Broadband 90° Phase Change," Society of Photo-optical Instrumentation Engineers, 190, 81–88, LASL Optics Conference (1979), to change the input polarization 22 to a circularly polarized signal as shown by indicator 24.

Simultaneously, $CO_2$ pump laser 26 produces a $CO_2$ input beam having a $CO_2$ input polarization illustrated by indicator 28. Although the $CO_2$ laser can be operated in any desired mode, higher output powers can be achieved using mode-locked $CO_2$ pulses rather than smooth $CO_2$ laser pulses since the breakdown threshold of the Raman scattering medium is more dependent upon total energy delivered than it is upon the intensity of the short duration $CO_2$ mode-locked pulses. The $CO_2$ laser pump signal is transmitted through the Ge Brewster plate 18 and applied to circular polarizer 20 which produces a circular polarization in the $CO_2$ laser pump signal illustrated by indicator 30.

The Stokes injection source 10 is activated so as to overlap the $CO_2$ pulse both temporally and spatially after being combined at the Ge Brewster plate. The two pulses copropagate and achieve opposite circular polarization after passing through circular polarizer 20. The copropagating beams are then reflected by reflectors 32 and 34 and focused by lens 36 on the opening of the cooled capillary 38 within the $H_2$ Raman cell 40. The $H_2$ Raman cell amplifies the Stokes input signal by Raman scattering of the $CO_2$ laser pump radiation using rotational transitions in a diatomic molecular gas such as $H_2$. The manner in which this is accomplished is more specifically disclosed in the above-referenced U.S. patents issued to Norman A. Kurnit.

The $CO_2$ laser pump signal which was partially depleted in the $H_2$ Raman cell 40 and the amplified Stokes radiation signal are recollimated by lens 42 and directed to KBr prism 14 via reflectors 44 and 46. Both the $CO_2$ laser pump signal and the amplified Stokes radiation signal are partially reflected from the surface of the KBr prism 14 towards LiF reflector 16 colinearly with the collimated Stokes input 12. Typically, only a portion (e.g., 9%) of the amplified Stokes signal and a portion of the $CO_2$ laser pump signal are reflected from the surface of the KBr prism 14. The primary portion of the $CO_2$ laser pump signal and amplified Stokes signal is refracted by the KBr prism 14 and directed in the manner shown by Stokes output 48 and undepleted $CO_2$ output 50. The reflected and refracted Stokes output beam 52 is applied to an output monitor to record the intensity of the Stokes output 48. In a similar manner, reflected beam 54 is applied to an input monitor to record the intensity of the collimated Stokes input 12.

$CO_2$ pump laser radiation reflected by KBr prism 14 is rejected by LiF reflector 16 to prevent further transmission of the partially depleted and incorrectly polarized $CO_2$ laser pump signal around the ring cavity. Of course, other devices may be used in place of LiF reflector 16 and in some cases the LiF reflector may be eliminated. The amplified Stokes signal, however, is reflected by LiF reflector 16 and Ge Brewster plate 18 in the same manner as the collimated Stokes input 12. Since the collimated Stokes input pulse 12 has a pulse length which is much shorter than the overall pulse length of the mode-locked $CO_2$ laser pulse envelope, the length of the ring cavity can be adjusted such that the amplified Stokes signal can be directed around the ring cavity so that the Stokes signal reflected by KBr prism 14 will overlap a latter portion of the $CO_2$ laser pump signal. This manner of achieving temporal overlap allows a much greater portion of the energy of the $CO_2$ laser pump signal to be extracted in the form of Stokes radiation. Additionally, the overall $CO_2$ laser pump envelope can be made sufficiently long to allow for multiple passes of the Stokes signal around the ring cavity to provide even greater amplification.

Consequently, the regenerative ring amplifier illustrated in FIG. 1 allows the $CO_2$ pump radiation and both the collimated Stokes input 12 and amplified Stokes radiation to be transmitted around the ring cavity in a spatially copropagating beam. As compared to the regenerative amplifier such as illustrated in the above-referenced U.S. Pat. No. 4,222,011, the preferred embodiment of the present invention illustrated in FIG. 1 has the advantage that the $CO_2$ pump and Stokes field propagate in the same direction, which gives the highest Raman gain both because of the difference in forward and backward Raman line width for counterpropagating beams and because of the better spatial and temporal overlap for copropagating beams especially if the pump signal has intensity fluctuations or a mode-locked structure. Although it would be possible to double pass the $CO_2$ laser radiation in the above-referenced U.S. Pat. No. 4,222,011, i.e., reflect the $CO_2$ radiation back through the $H_2$ Raman cell with the amplified Stokes signal to achieve a copropagating beam, such a configuration would result in a much lower breakdown threshold than the device of the present invention. Additionally, since no dichroic mirrors are utilized in the present invention, there is no problem with damage to these elements. Moreover, all of the Stokes radiation can be inserted into the cavity rather than only a fraction due to the reflectivity of the dichroic mirrors. Furthermore, because of the very high gain which can be achieved in two passes around the ring cavity, very little of the Stokes output needs to be fed back and consequently most of the Stokes energy generated in the ring cavity is available as output energy. The present invention also allows for the use of much lower intensity Stokes injection sources which are normally more readily available at the precise frequency desired. Also, neither the pump signal nor the Stokes output signal are returned toward the $CO_2$ laser 26 or Stokes source 10 which protects these devices from reinjection of these output signals.

Figure 2:
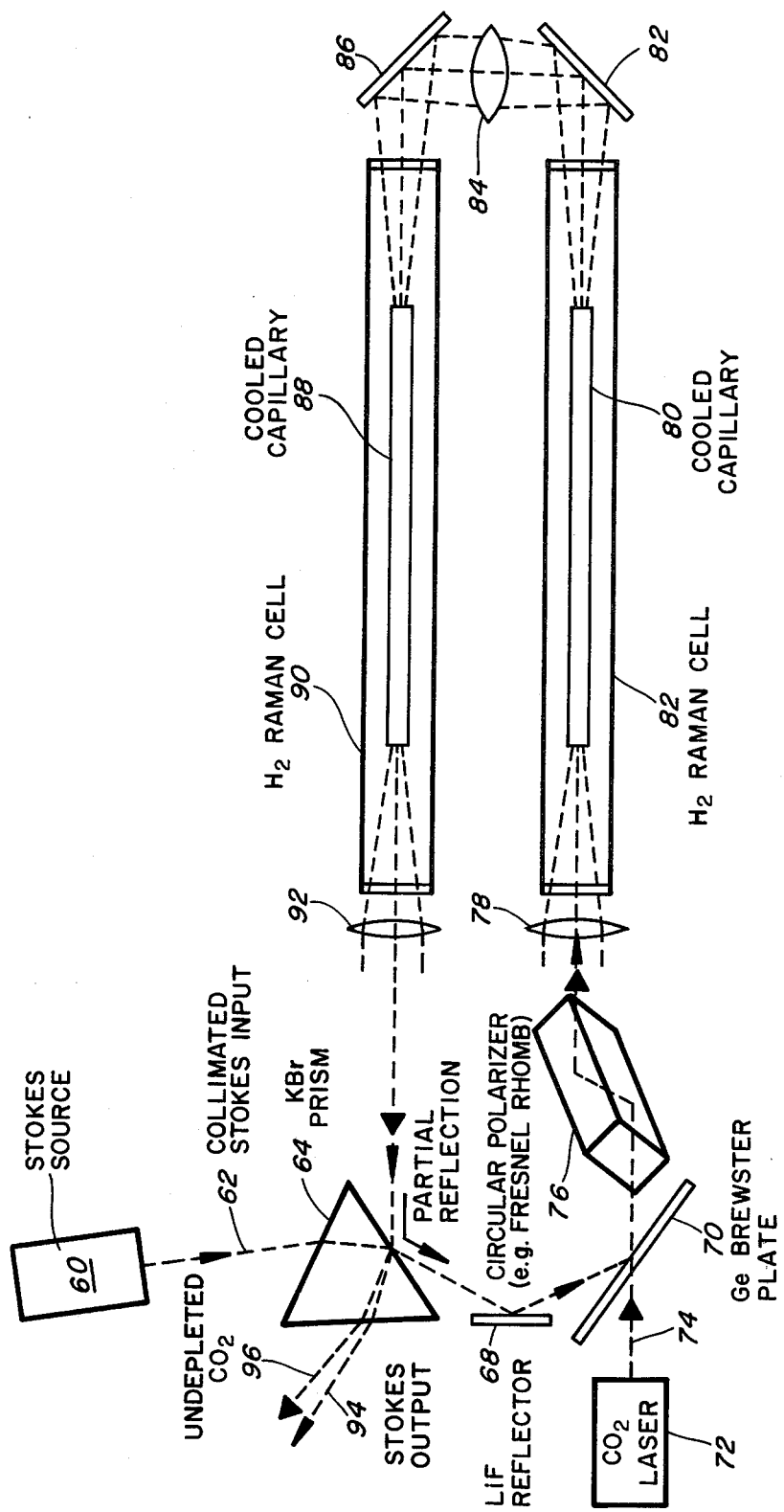
FIG. 2 is a schematic illustration of a particular implementation of the regenerative ring amplifier of the preferred embodiment of the invention.

FIG. 2 illustrates an alternative manner of implementing the regenerative ring amplifier illustrated in FIG. 1. As shown in FIG. 2, Stokes source 60 produces a collimated Stokes input signal 62 which is refracted by KBr prism 64 reflected by LiF reflector 68 and Ge Brewster plate 70. $CO_2$ laser 72 produces a spatially filtered and collimated $CO_2$ laser pulse having a mode-locked structure 74 which is transmitted through Ge Brewster plate 70 where it is combined with the collimated Stokes input 62 so that the two beams copropagate. Circular polarizer 76 circularly polarizes the collimated Stokes input 62 and the $CO_2$ laser pump signal 74 in opposite senses. Lens 78 focuses the copropagating beam on the opening of cooled capillary 80 in $H_2$ Raman cell 82. The output beam is reflected by reflector 82, refocused by lens 84, and reflected by reflector 86 so that the copropagating beam focuses on the opening of cooled capillary 88 in $H_2$ Raman cell 90. The copropagating beam is then recollimated by lens 92 and directed toward KBr prism 64 which functions to partially reflect a small portion of the copropagating beam and refract a major portion of the copropagating beam to produce Stokes output 94 and undepleted $CO_2$ output 96.

The advantage of this configuration illustrated in FIG. 2 is that a second waveguide is added in the return leg of the ring cavity so that the region where there is gain in the cavity is doubled without increasing the round trip time.

Figure 3:
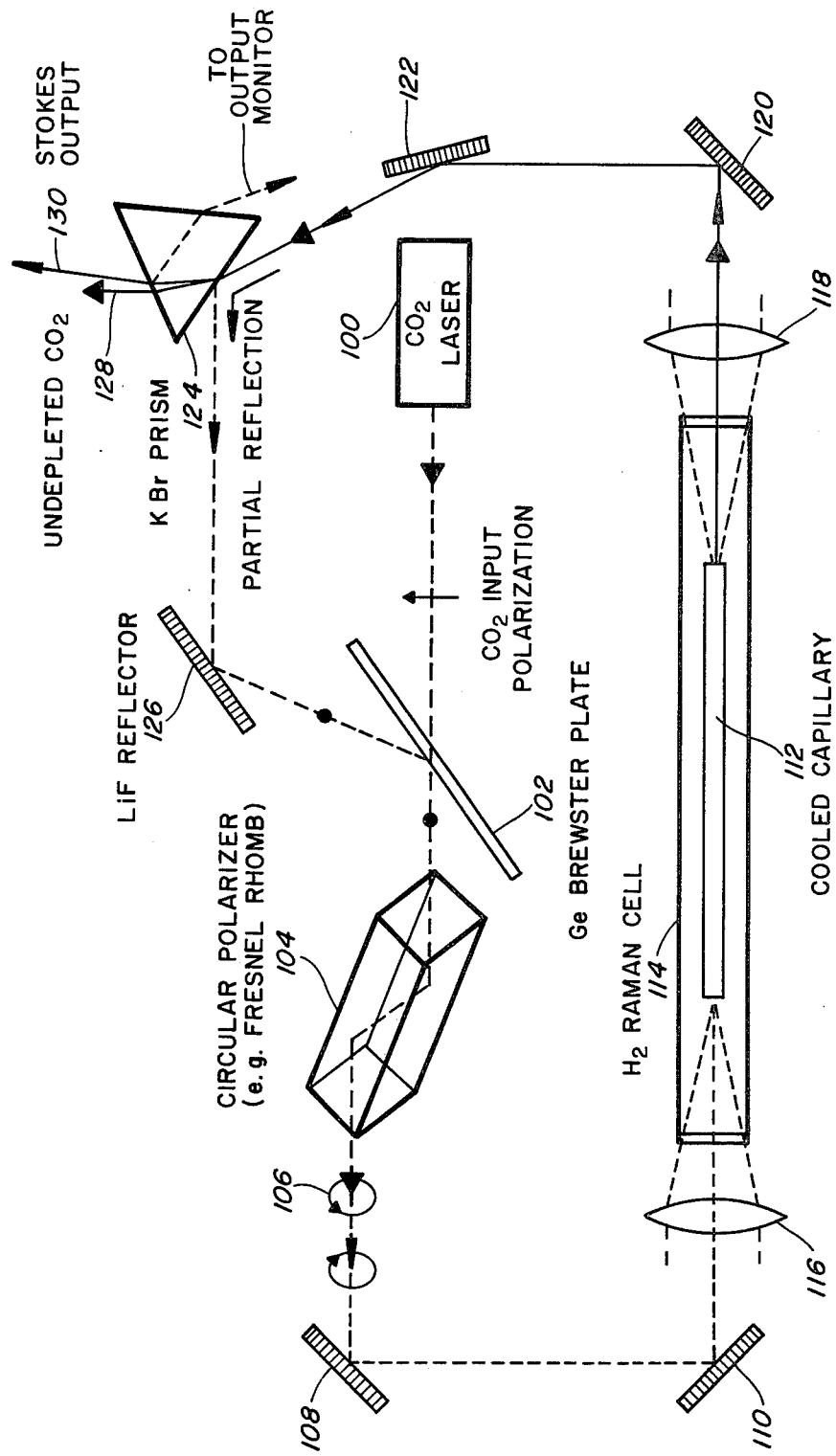
FIG. 3 is a schematic illustration of the regenerative ring oscillator of the preferred embodiment of the invention.

FIG. 3 schematically illustrates the regenerative ring oscillator of the preferred embodiment of the invention. In operation, $CO_2$ laser 100 produces a pump signal which is transmitted through Ge Brewster plate 102 and circularly polarized in circular polarizer 104 as shown by indicator 106. The $CO_2$ pump signal is then reflected by reflectors 108 and 110 and focused on the opening of the cooled capillary 112 in $H_2$ Raman cell 114 by lens 116. Stokes radiation is spontaneously generated in the $H_2$ Raman cell by Raman scattering of the $CO_2$ laser pump signal using rotational transitions in a diatomic molecular gas, such as $H_2$, as disclosed in the above-referenced citations. The Stokes signal, which was spontaneously generated in the $H_2$ Raman cell 114, and the $CO_2$ pump signal are then collimated by lens 118 and reflected by reflectors 120 and 122 toward the KBr prism 124. In the same manner disclosed in FIGS. 1 and 2, a portion of the copropagating beam is reflected by KBr prism 124 toward LiF reflector 126 which functions to reflect the Stokes signal and reject the $CO_2$ laser pump signal. The KBr prism 124 also refracts the undepleted $CO_2$ output 128 and Stokes output 130. The Stokes signal which was spontaneously generated in $H_2$ Raman cell 114 is then combined with the $CO_2$ laser pump signal by Ge Brewster plate 102 for multiple passes around the ring cavity, until the Stokes radiation is amplified sufficiently to produce a significant Stokes output signal 130 and the $CO_2$ laser pump radiation is significantly depleted.

Figure 4:
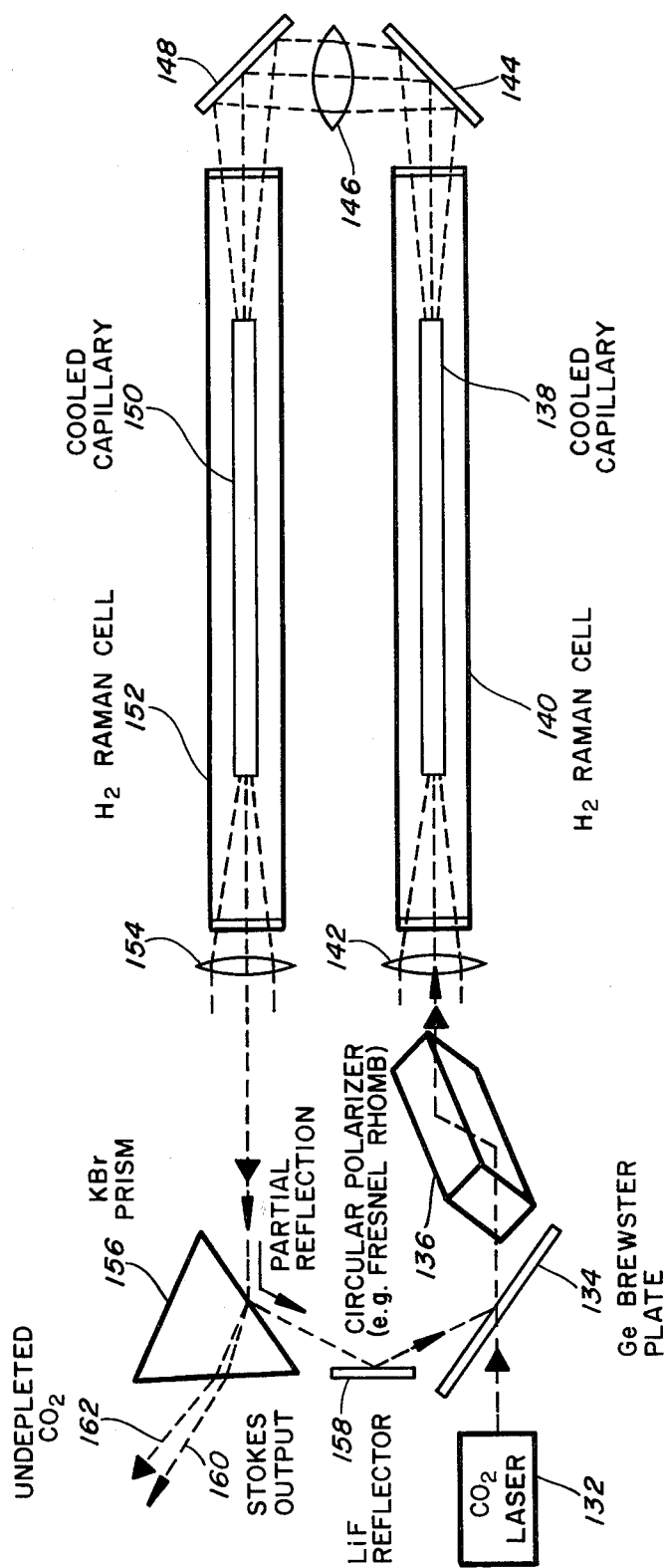
FIG. 4 is a schematic illustration of a particular implementation of the regenerative ring oscillator of the preferred embodiment of the invention.

FIG. 4 illustrates another manner of implementing the regenerative oscillator of the preferred embodiment of the present invention. As illustrated in FIG. 4, $CO_2$ laser 132 produces a $CO_2$ pump signal which is transmitted through Ge Brewster plate 134 to circular polarizer 136 which circularly polarizes the $CO_2$ laser pump signal. The circularly polarized $CO_2$ laser pump signal is then focused on the opening of cooled capillary 138 of $H_2$ Raman cell 140 by lens 142. The $H_2$ Raman cell 140 functions to spontaneously generate a Stokes signal by Raman scattering of the $CO_2$ laser pump signal using rotational transitions in a diatomic molecular gas such as $H_2$. The copropagating $CO_2$ laser pump signal and Stokes signal emitted by $H_2$ Raman cell 140 is reflected by reflector 144, focused by lens 146 and reflected by reflector 148 on the opening of cooled capillary 150 of $H_2$ Raman cell 152. $H_2$ Raman cell 152 functions to further amplify the Stokes signal which was spontaneously generated in $H_2$ Raman cell 140. The copropagating beam is then collimated by lens 154 and partially reflected by KBr prism 156 onto LiF reflector 158 which reflects the Stokes signal and rejects the $CO_2$ laser pump signal. The partially reflected Stokes signal is then combined with the $CO_2$ laser pump signal produced by $CO_2$ laser 130 by Ge Brewster plate 134 for successive passes around the ring cavity. KBr prism 156 also functions to refract the Stokes output 160 and the undepleted $CO_2$ output 162.

As in FIG. 2, the device of FIG. 4 utilizes a Raman waveguide amplifier in the return leg of the ring cavity so that the region of amplification is doubled without increasing the round trip time.

In operation, gains as high as $e^9$ in a 3 m long waveguide have been observed using the peak intensity spike of a free running $CO_2$ laser. From these experimental results, an accurate estimate can be made of the performance of the systems illustrated in FIGS. 1-4. For example, a cavity can be designed so that the $CO_2$ laser is mode-locked with a round trip period equal to the Raman cavity round trip. Further, it is reasonable to assume that the first intensity spike which gives appreciable gain would have a single pass gain of $e^6$ and for a pass through a second waveguide, a gain of $e^4$, accounting for waveguide losses and optics losses. It should be noted, however, that these losses could be virtually eliminated by focusing into a smaller bore waveguide to keep the peak intensity of both waveguides the same. The cavity is designed such that only approximately 5% (which is approximately $e^{-3}$) of the energy is fed back. The round trip gain is therefore equal to $e^{6+4-3}=e^7$. This amplified signal then retraces its pass through the two waveguides synchronously with the next mode-locked pump spike, which, if it is one of the largest spikes, would give a gain of $e^{9+6-3}=e^{12}$, for an overall gain of $e^{19}$. If the next pump spike is equally as large, it will bring the overall gain to $e^{31}$, which is sufficient to produce significant outputs starting from spontaneous Raman scattering. Subsequent pulses should be efficiently converted to Stokes frequency by driving the Raman gain into heavy saturation in the trailing half of the $CO_2$ pump envelope.

Figure 5:
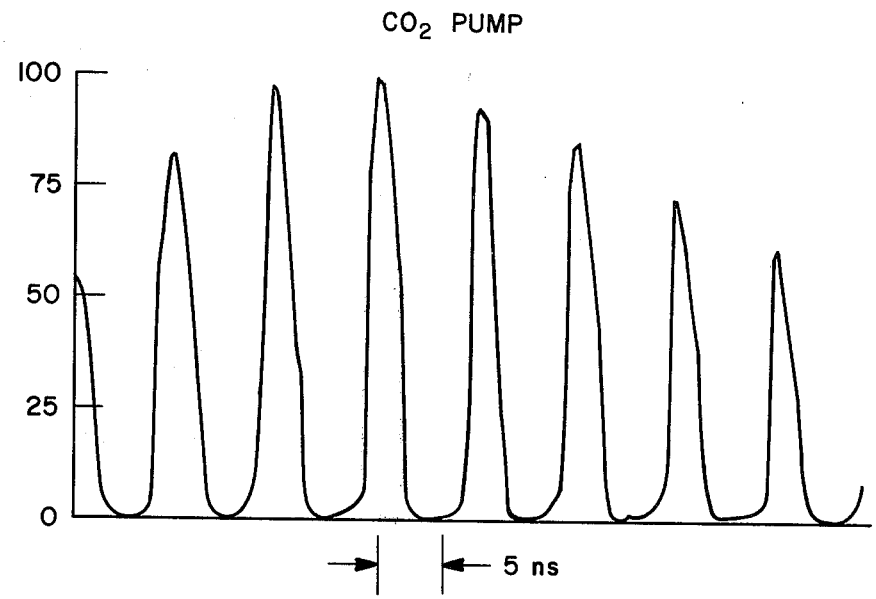
FIG. 5 is a schematic illustration of a mode-locked $CO_2$ laser pulse.
Figure 6:
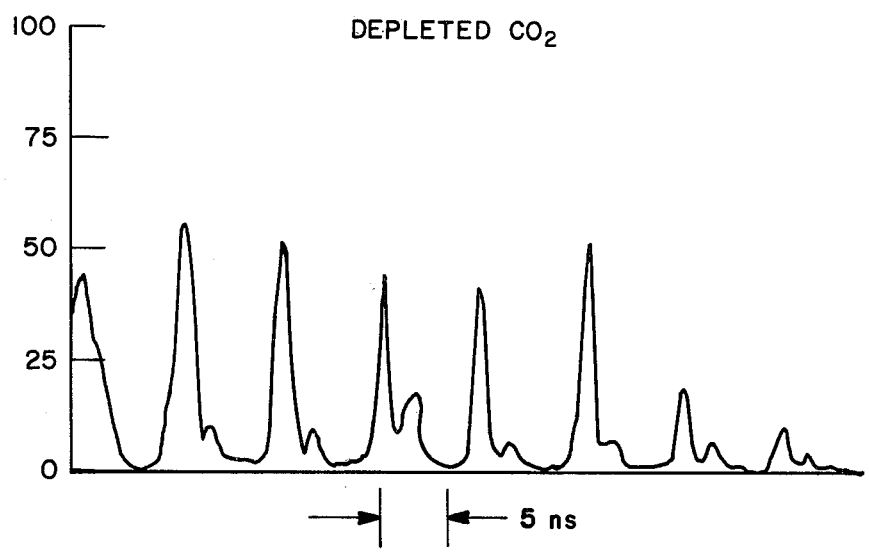
FIG. 6 is a schematic illustration of a depleted $CO_2$ laser pulse emitted from the ring cavity of the preferred embodiment of the invention.

FIG. 5 illustrates a $CO_2$ pump signal having a mode-locked structure. FIG. 6 illustrates the fact that depletion is stronger in the falling edge of each $CO_2$ spike, due to the transient gain of the system. The results illustrated in FIG. 6 were produced by a ring cavity which has a round trip time equal to the period of the mode-locked pulses of the $CO_2$ pump signal.

The present invention therefore provides a regenerative ring amplifier and regenerative ring oscillator which overcome many disadvantages of the prior art. The present invention increases temporal and spatial overlap of $CO_2$ and Stokes radiation signals in a simple and efficient system. This allows for greater extraction of $CO_2$ energy and provides for higher intensity Stokes output signals. At the same time, the device of the present invention avoids problems of breakdown threshold and the use of damage prone elements such as dichroic mirrors which can greatly reduce the performance of the system. In addition, maximum gain can be achieved in the ring cavity by providing a Raman capillary waveguide amplifier in the return leg without increasing the round trip time of the cavity.

The foregoing description of a preferred embodiment of the present invention has been presented for the purpose of illustration and description. It is not intended to be exhaustive or to limit the invention to the precise form disclosed, and obviously many modifications and variations are possible in light of the above teachings. For example, although a Raman capillary waveguide amplifier has been disclosed, any suitable Raman amplifier device could be used including any suitable Raman waveguide amplifier. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A ring cavity for a Stokes injected Raman capillary waveguide amplifier system comprising:
   Raman capillary waveguide amplifier means for Raman scattering $CO_2$ laser radiation by rotational states of a diatomic molecular gas;
   external Stokes radiation source means aligned for injecting an external Stokes signal into said Raman capillary waveguide amplifier means such that said external Stokes signal coprogpagtes with said $CO_2$ laser radiation and whereby said external Stokes signal reduces the gain required in said Raman capillary waveguide amplifier to generate an amplified Stokes signal;

means for injecting a portion of said amplified Stokes signal back into said Raman capillary waveguide amplifier means in the same direction as said external Stokes signal to extend the effective duration of said external Stokes signal and to extract additional energy from said $CO_2$ laser radiation.

2. The ring cavity of claim 1 wherein said external Stokes radiation source comprises a diode laser.

3. The ring cavity of claim 1 wherein said external Stokes radiation source comprises an optical parametric oscillator.

4. The ring cavity of claim 1 wherein said external Stokes radiation source comprises an optically pumped laser.

5. A ring cavity for a Stokes injected Raman capillary waveguide amplifier system comprising:
a source of $CO_2$ laser pump radiation;
an external source of Stokes radiation;
capillary waveguide amplifier means containing a diatomic molecular gas;
means for injecting said $CO_2$ laser pump radiation and said Stokes radiation into said capillary waveguide amplifier means to induce amplification of said Stokes radiation by Raman scattering of said $CO_2$ laser pump radiation using rotational transitions in said diatomic molecular gas;
means for feeding back a portion of said Stokes radiation amplified by said capillary waveguide amplifier means for injection into said capillary waveguide amplifier in the same direction as said $CO_2$ laser pump radiation to cause said $CO_2$ laser pump radiation and said Stokes radiation amplified by said capillary waveguide amplifier means to copropagate through said capillary waveguide amplifier means to increase spatial and temporal overlap and extraction of energy from said $CO_2$ laser pump radiation.

6. The ring cavity of claim 5 wherein said diatomic molecular gas comprises para-$H_2$.

7. A regenerative ring amplifier comprising:
$CO_2$ laser means for producing a $CO_2$ laser pump signal;
Stokes radiation source means for producing a Stokes radiation signal;
means for combining said $CO_2$ laser pump signal and said Stokes radiation signal to produce a combined copropagating $CO_2$ laser pump signal and Stokes radiation signal;
means for directing said copropagating $CO_2$ laser pump signal and Stokes radiation signal through a first Raman scattering capillary waveguide amplifier means to amplify said Stokes radiation signal by Raman scattering of said $CO_2$ laser pump signal using rotational transitions in a diatomic molecular gas;
means for directing said copropagating $CO_2$ laser pump signal and Stokes radiation signal through at least one additional Raman capillary waveguide amplifier in a return leg of said ring cavity to further amplify said Stokes radiation signal by Raman scattering of said $CO_2$ laser pump signal using rotational transitions in a diatomic molecular gas;
means for combining a portion of said amplified Stokes radiation signal with said combined copropagating $CO_2$ laser pump signal and Stokes radiation signal in a single beam path to increase the intensity of Stokes radiation in said regenerative ring amplifier and thereby increase the amount of energy extracted from said $CO_2$ laser pump signal.

8. The regenerative ring amplifier of claim 7 wherein said diatomic molecular gas comprises para-$H_2$.

9. A regenerative ring oscillator comprising:
$CO_2$ laser means for producing a $CO_2$ laser pump signal;
means for directing said $CO_2$ laser pump signal through a first Raman capillary waveguide amplifier means to spontaneously generate a Stokes signal by Raman scattering of said $CO_2$ laser pump signal using rotational transitions in a diatomic molecular gas;
means for directing said $CO_2$ laser pump signal and said Stokes signal in a copropagating beam through at least one additional Raman capillary waveguide amplifier in a return leg of said ring cavity to further amplify said Stokes signal;
means for feeding back a portion of said Stokes signal into said regenerative ring oscillator to increase the intensity of Stokes radiation in said regenerative ring oscillator and thereby increase the amount of energy extracted from said $CO_2$ laser pump signal.

10. The regenerative ring oscillator of claim 9 wherein said diatomic molecular gas comprises para-$H_2$.

11. A regenerative ring amplifier comprising:
$CO_2$ laser means for producing a $CO_2$ laser pump signal;
Stokes radiation source means for producing a Stokes radiation signal;
means for combining said $CO_2$ laser pump signal and said Stokes radiation signal to produce a combined copropagating $CO_2$ laser pump signal and Stokes radiation signal;
means for directing said copropagating $CO_2$ laser pump signal and Stokes radiation signal through Raman scattering capillary waveguide amplifier means to amplify said Stokes radiation signal by Raman scattering of said $CO_2$ laser pump signal using rotational transitions in a diatomic molecular gas;
means for combining a portion of said amplified Stokes radiation signal with said combined copropagating $CO_2$ laser pump signal and said Stokes radiation signal in a single beam path to increase the intensity of Stokes radiation in said regenerative ring amplifier and thereby increase the amount of energy extracted from said $CO_2$ laser pump signal.

12. A regenerative ring oscillator comprising:
$CO_2$ laser means for producing a $CO_2$ laser pump signal;
means for directing said $CO_2$ laser pump signal through Raman capillary waveguide amplifier means to spontaneously generate a Stokes signal by Raman scattering of said $CO_2$ laser pump signal using rotational transitions in a diatomic molecular gas;
means for feeding back a portion of said Stokes signal into said regenerative ring oscillator so as to copropagate with said laser pump signal and to increase the intensity of Stokes radiation in said regenerative ring oscillator and thereby increase the amount of energy extracted from said $CO_2$ laser pump signal.

* * * * *